US008478468B2

(12) United States Patent
Kalhous et al.

(10) Patent No.: US 8,478,468 B2
(45) Date of Patent: Jul. 2, 2013

(54) CARBON DIOXIDE FEEDBACK FOR AUTOMOBILE

(75) Inventors: Amanda J. Kalhous, Ajax (CA); Norman J. Weigert, Whitby (CA); Jarvis Chau, Toronto (CA); Glenn B. Bryksaw, Oshawa (CA)

(73) Assignee: GM Global Technology Operations LLC, Detroit, MI (US)

( * ) Notice: Subject to any disclaimer, the term of this patent is extended or adjusted under 35 U.S.C. 154(b) by 323 days.

(21) Appl. No.: 13/022,026

(22) Filed: Feb. 7, 2011

(65) Prior Publication Data

US 2011/0224854 A1 Sep. 15, 2011

Related U.S. Application Data

(60) Provisional application No. 61/313,510, filed on Mar. 12, 2010.

(51) Int. Cl.
*B60Q 1/00* (2006.01)

(52) U.S. Cl.
USPC .............................. 701/22; 701/101; 701/32.9

(58) Field of Classification Search
USPC .................. 701/22, 36, 101, 29.1, 32.9, 33.1, 701/34.1, 34.3
See application file for complete search history.

(56) References Cited

U.S. PATENT DOCUMENTS

2006/0184445 A1 * 8/2006 Sandor et al. .................... 705/37
2011/0145438 A1 * 6/2011 Sakamoto ..................... 709/238

* cited by examiner

*Primary Examiner* — Richard M. Camby
(74) *Attorney, Agent, or Firm* — Cantor Colburn LLP

(57) ABSTRACT

A carbon dioxide feedback system and a method of providing carbon dioxide feedback in a computer system is provided. The method includes computing an amount of carbon dioxide generation avoided by a vehicle at a processor, calculating a number of equivalent trees based on the computation, and displaying the number of equivalent trees on a display device.

14 Claims, 3 Drawing Sheets

CARBON DIOXIDE FEEDBACK FOR AUTOMOBILE

CROSS-REFERENCES TO RELATED APPLICATIONS

This patent application claims priority to U.S. Provisional Patent Application Ser. No. 61/313,510 filed Mar. 12, 2010, which is incorporated herein by reference in its entirety.

FIELD OF THE INVENTION

The subject invention relates to systems and methods for providing vehicle related feedback and, more particularly, to a vehicular feedback systems and methods that provide carbon dioxide feedback.

BACKGROUND

Vehicles with advanced propulsion systems are typically viewed by consumers as an environmentally-friendly alternative to vehicles with traditional internal combustion engines. As such, these hybrid and electric vehicles are often thought of as being 'green.' Automobile manufacturers have displayed biological displays (ex. Leaf symbols) in a variety of forms to reinforce this connection.

While existing displays are attractive for marketing campaigns and offer the consumer some feedback related to their driving behaviors, they do not provide feedback to the consumer regarding their actual carbon dioxide emissions. In addition, monitoring user driving habits typically comprises an inefficient process with little flexibility. A user that desires to optimize his/her driving habits to minimize waste (e.g., fuel, cost, carbon dioxide emissions, etc.) may review reading materials that guide or specify to a user on ways of optimizing ones driving habits. However, these reading materials can be difficult to obtain. Once obtained, reviewing these materials can be time consuming and costly.

Accordingly, it is desirable to provide consumers with feedback as to how they have reduced their carbon dioxide emissions in terms that continue to reinforce the link between advanced propulsion systems and environmental stewardship.

SUMMARY OF THE INVENTION

In one exemplary embodiment of the present invention a method of providing carbon dioxide feedback in a computer system is provided. The method includes computing an amount of carbon dioxide avoided by a vehicle at a processor, calculating a number of equivalent trees based on the computation, and displaying the number of equivalent trees on a display device.

In another exemplary embodiment of the present invention a carbon dioxide feedback system is provided. The system includes a computer memory; and one or more processors in communication with the computer memory, the one or more processors configured to perform a method comprising: computing an amount of carbon dioxide avoided by a vehicle; calculating a number of equivalent trees based on the computation; and generating display signals that display the number of equivalent trees on a display device.

The above features and advantages and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
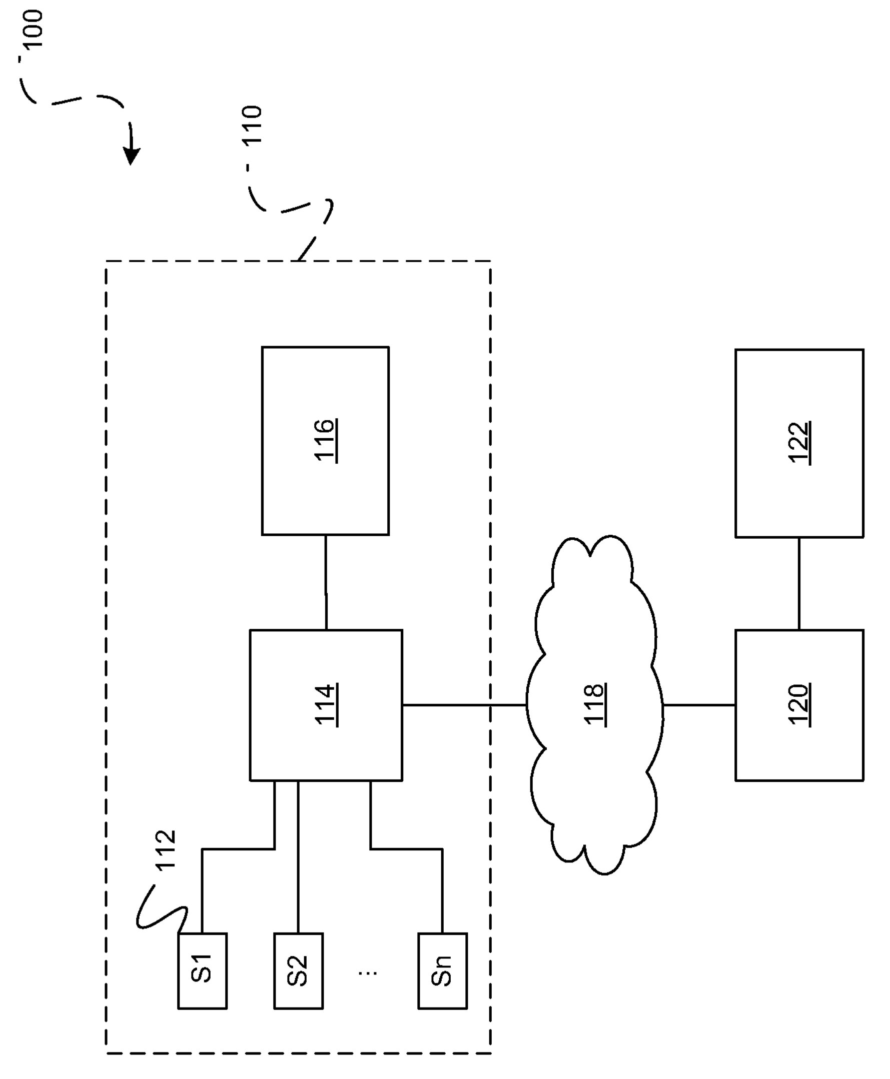
FIG. 1 is a block diagram of a vehicular feedback system in accordance with exemplary embodiments.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, one or more software or firmware programs, a combinational logic circuit, and/or other suitable components that provide the described functionality.

Referring now to FIG. 1, a block diagram illustrates a vehicular feedback system generally at 100 according to exemplary embodiments. The vehicular feedback system 100 generally comprises a vehicle 110 that includes one or more sensing devices 112, and a computing module 114. As can be appreciated, the vehicle 110 can be any type or model with varying engine system types. For example, the vehicle 110 can be an electric vehicle, a non-electric vehicle with an internal combustion engine (ICE), or a hybrid of both. In the case of the non-electric vehicle or hybrid vehicle, the vehicle 110 can include an engine system (not shown). The engine system may include, but is not limited to, a diesel engine system, a gasoline direct injection system, a homogenous charge compression ignition engine system, or any other internal combustion engine.

The sensing devices 112 sense operating conditions of the vehicle 110. In various embodiments, the sensing devices 112 are an integral part of one or more components or subsystems of the vehicle 110 or are mounted directly or indirectly on the vehicle 110 or parts thereof. In various other embodiments, one or more of the sensing devices 112 are in signal communication (e.g., via cables, connecting harness, wirelessly, etc.) with the vehicle 110.

The computing module 114 receives signals from the sensing devices 112 and computes carbon dioxide ($CO_2$) performance and reduction values and other vehicle related information. In various embodiments, the computing module 114 utilizes these values to estimate $CO_2$ feedback data and communicates the data to a display 116 to provide graphical or textual feedback to a user. The feedback provides information to the user about how his/her driving habits contribute to $CO_2$ reduction. In various embodiments, the computing module 114 can provide carbon dioxide feedback by determining wasteful driving habits. The carbon dioxide feedback can be presented to the user in a pictorial or graphical form. For example, the carbon dioxide feedback can be presented to the user in the form of trees affected by the driving habit.

In one example, the computing module 114 may evaluate a driving habit such as vehicle braking force applied immediately after an acceleration event (e.g., within 60 seconds) and may calculate the $CO_2$ representing this amount of energy (whether the vehicle is electric or gas operated at that moment). This calculation provides the user with the amount of $CO_2$ needlessly generated. As can be appreciated, the computing module 114 can perform an analysis of other driving habits and is not limited to the present example.

As can be appreciated, the computing module 114 and/or the display 116 can be an integral part of one or more components or subsystems of the vehicle 110 or can be external to the vehicle 110. For example, the computing module 114 can be implemented in one of the control modules (not shown) of the vehicle 110 or can be implemented in a computer, laptop, server, personal handheld device, or any other computing device having a processor and memory.

In various embodiments, when the computing module 114 is part of the vehicle 110, the computing module 114 can communicate the feedback values through a network 118 to an external computing module 120. The network 118 can be any type, or a combination thereof, of known networks including, but not limited to, a wide area network (WAN), a local area network (LAN) such as, for example, the Internet, Intranet(s), and/or wireless communication network(s). The external computing module 120 can be any computing device having a processor and memory, including, but not limited to, a computer, a laptop, a server, a personal handheld device, and can similarly communicate the feedback values to a display 122 to provide pictorial, graphical, or textual feedback to a user.

Figure 2:
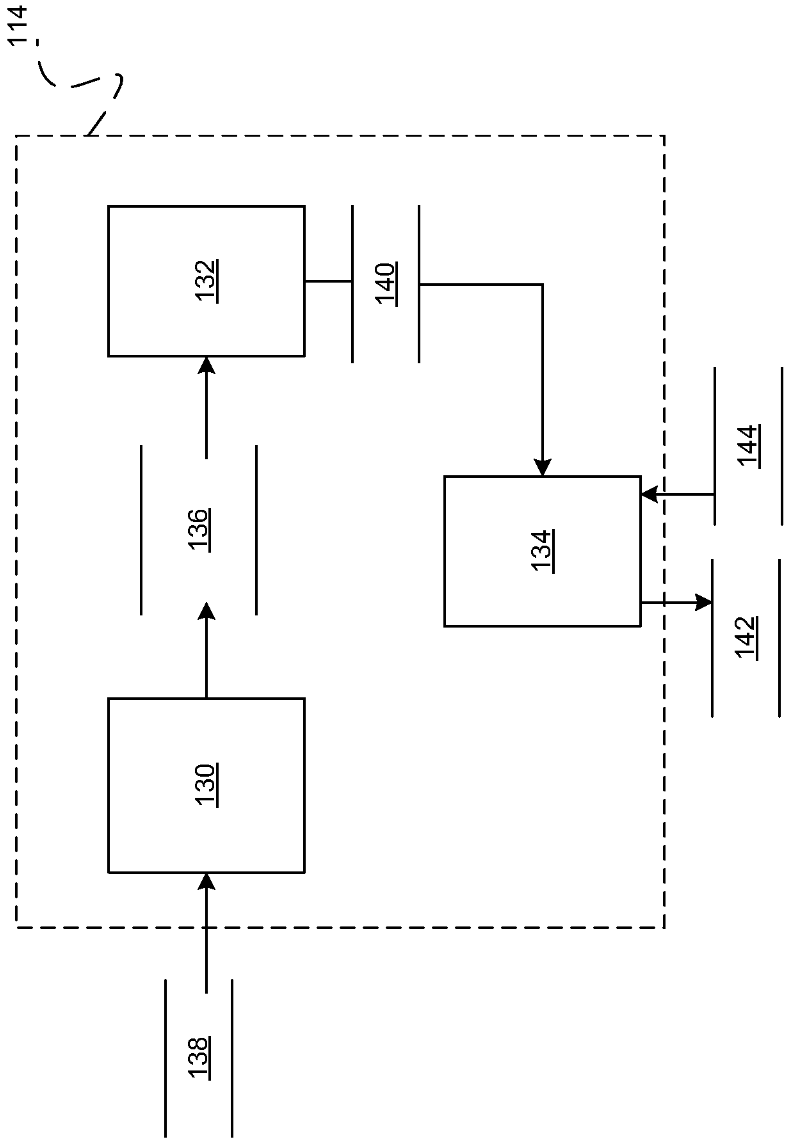
FIG. 2 is a block diagram of a computing system of the vehicular feedback system in accordance with exemplary embodiments.

Referring now to FIG. 2, a dataflow diagram illustrates various embodiments of the computing module 114 of the vehicle feedback system 100. As can be appreciated, various embodiments of computing modules according to the present disclosure may include any number of sub-modules embedded within the computing module 114. For example, the sub-modules shown in FIG. 2 may be combined and/or further partitioned to similarly compute the carbon dioxide ($CO_2$) performance and reduction values. Inputs to the sub-modules may be received from the sensing devices 112 (FIG. 1), may be received from other modules (not shown) within the vehicle 110 (FIG. 1), and/or may be received from other sub-modules (not shown) within the computing module 114.

In various embodiments, the computing module 114 includes a $CO_2$ computation module 130, a tree estimation module 132, and a display module 134. The computation module 130 computes carbon dioxide performance and reduction values 136 based on vehicle related data 138 and one or more algorithms. As can be appreciated, the calculation of $CO_2$ performance and reduction can be based on the various engine types of other vehicles comparable to the vehicle 110. For example, the $CO_2$ feedback can be based on a vehicle comparison model that identifies the $CO_2$ performance and reduction on various vehicle models and is not limited to the vehicle being driven (e.g., vehicle 110). As such, the computation module 130 can identify how the vehicle 110 compares to other vehicles with respect to its impact on the environment, particularly its $CO_2$ contribution or reduction.

In various embodiments, the computation module 130 computes an amount of $CO_2$ generation (e.g. lbs of $CO_2$) avoided using one or more algorithms/equations. In an exemplary embodiment, the amount (lbs) of $CO_2$ generation avoided is calculated using the following equation:

$$\text{CO2 avoided}=EM*FE*Kg*2.2. \quad (1)$$

Where, EM represents the electric mileage. FE represents the fuel economy for an equivalent gas engine. Kg represents the kilograms of $CO_2$ in one liter of gasoline, and 2.2 is the conversion to pounds. Of course, variations of equation 1 can be used to calculate the amount of $CO_2$ generation avoided, such as, for example, using various conversion factors. In this equation, assumptions are made, such as, for example, 1 liter of gasoline is equal to 2360 g $CO_2$, and a 1.4 liter internal combustion engine is capable of a fuel economy of 5.5 L/100 kilometers (km). Of course, these assumptions can vary based on various factors. For example, the fuel economy for an equivalent ICE of another vehicle can be used to compute the amount of $CO_2$ generation avoided.

The tree estimation module 132 estimates a number of trees 140 that may be affected based on the carbon dioxide performance and reduction values 136. For example, the tree estimation module 132 estimates a number of equivalent trees planted based on the amount of $CO_2$ generation avoided by the vehicle 110 using one or more algorithms/equations. For example, the number of equivalent trees planted can be estimated using the following equation:

$$\text{No of Trees}=CO_2\text{ avoided}*\text{average }CO_2\text{ sequestered by mature tree.} \quad (2)$$

Of course, variations of equation 2 can be used to compute the number of trees planted. In this equation, assumptions are made, such as, for example, the average $CO_2$ sequestered by a mature tree is equal to 50 pounds.

The display module 134 generates display signals 142, including feedback data based on the estimated number of trees 140, to the display 116 (FIG. 1). For example, the display 116 (FIG. 1) can be used to allow the user to view the feedback data. In various embodiments, the display module generates the display signals 142 such that the feedback data is displayed in the form of a graph, a picture, an animation, a table, text, or a combination thereof. Of course, other forms of displaying or reporting the feedback data can be used in other exemplary embodiments and should not be limited to the examples described herein. For example, feedback data can be audibly reported to the user.

In addition to the tree information, the feedback data can further include, the carbon dioxide performance and reduction values 136. For example, the values can include, but are not limited to, non-electric mileage (kilometers (km)), electric mileage (km), $CO_2$ emissions (grams), the lbs of $CO_2$ generation avoided, fuel saved (liters ((L)), costs saved ($), mileage per trip, charge (kilowatt-hour (kWh), cost for electricity (based on $0.091/kwh), and cost per trip (based on $1.00/L), or any combination thereof. The units and values described herein can vary depending on the application. Various conversion factors can be used to obtain the desired units. Although the data described herein is in the metric standard, other systems of units can be used.

In an exemplary embodiment, the display module 134 generates display signals 142 and receives user input signals 144 that allows the user to select what data to view or compute through a graphical user interface (GUI). For example, the display module 134 generates GUIs that allow the user to select other competitor vehicles with an equivalent ICE to be used in computing the number of equivalent trees 140 or generate a vehicle comparison model.

Figure 3:
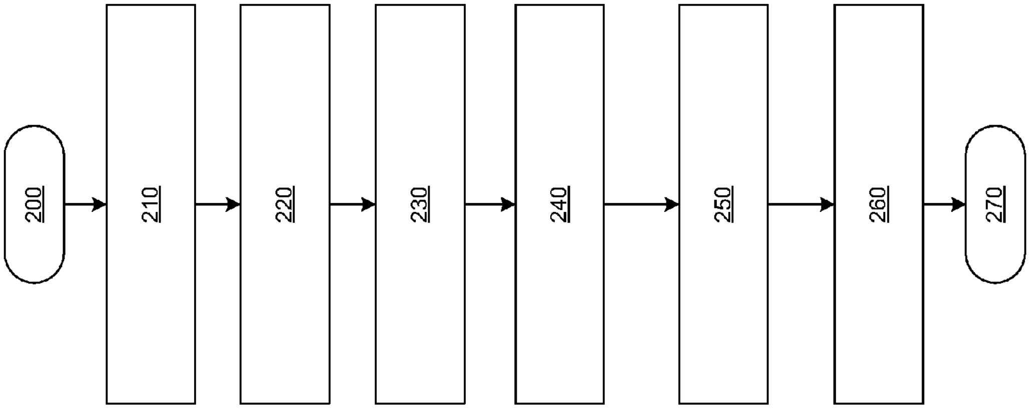
FIG. 3 is a functional flow diagram of a method for calculating a number of equivalent trees planted in accordance with exemplary embodiments.

With reference now to FIG. 3, a flow diagram illustrates a tree estimation method that can be performed by the computing module 114 in accordance with exemplary embodiments. As can be appreciated in light of the disclosure, the order of operation within the method is not limited to the sequential execution as illustrated in FIG. 3, but may be performed in one or more varying orders as applicable and in accordance with the present disclosure.

In one example, the method may begin at 200. At 210, determine electric mileage of the vehicle 110 using one or more existing algorithms. The driving habits detected by the sensing devices 112 may modify the electric mileage value as described above. At block 220, select a comparison engine type. Alternately, the comparison engine type is predefined or preselected. In an exemplary embodiment, the user selects one of many different equivalent engine types using a GUI. At 230, determine the fuel economy for the engine type selected or predefined. Next, apply one or more algorithms that use the electric mileage and the selected or preselected fuel economy as inputs at 240. As a result, the number of equivalent trees planted is determined at block 250. Signals are generated based on the number of trees and/or CO2 values at 260 and the method may end at 270.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A method of providing carbon dioxide generation feedback in a computer system, comprising:

computing an amount of carbon dioxide generation avoided by a vehicle at a processor;

calculating a number of equivalent trees affected based on the computation; and displaying the number of equivalent trees on a display device.

2. The method of claim 1, further including computing the amount of carbon dioxide generation avoided based on an electric mileage of the vehicle and a fuel economy of an engine type.

3. The method of claim 2, wherein the engine type is selectable by a user.

4. The method of claim 2, wherein the engine type is predefined.

5. The method of claim 1, further including calculating the number of equivalent trees based on the amount of carbon dioxide calculated and an average of carbon dioxide sequestered by an average tree.

6. The method of claim 1, further including comparing the amount of carbon dioxide generation avoided by the vehicle to an amount of carbon dioxide generation avoided by another vehicle and displaying the comparison on the display device.

7. The method of claim 1, wherein the number of equivalent trees affected is the number of equivalent trees planted.

8. A carbon dioxide feedback system, comprising:

a computer memory; and one or more processors in communication with the computer memory, the one or more processors configured to perform a method comprising:

computing an amount of carbon dioxide generation avoided by a vehicle;

calculating a number of equivalent trees based on the computation; and generating display signals that display the number of equivalent trees on a display device.

9. The system of claim 8, wherein the method further comprises computing the amount of carbon dioxide generation avoided based on an electric mileage of the vehicle and a fuel economy of an engine type.

10. The system of claim 9, wherein the engine type is selectable by a user.

11. The system of claim 9, wherein the engine type is predefined.

12. The system of claim 8, wherein the method further comprises calculating the number of equivalent trees planted based on the amount of carbon dioxide calculated and an average of carbon dioxide sequestered by an average tree.

13. The system of claim 8, wherein the method further comprises comparing the amount of carbon dioxide generation avoided by the vehicle to an amount of carbon dioxide avoided by another vehicle and generating the display signals to display the comparison on the display device.

14. The system of claim 8, wherein the number of equivalent trees is the number of equivalent trees planted.

* * * * *